United States Patent [19]
Bouchard

[11] 3,963,284
[45] June 15, 1976

[54] FRICTION REDUCING BEARING
[75] Inventor: John R. Bouchard, Canton, Mass.
[73] Assignee: Northrop Corporation, Los Angeles, Calif.
[22] Filed: Dec. 14, 1973
[21] Appl. No.: 425,321

[52] U.S. Cl. .............................. 308/187; 308/36.1; 308/78; 29/148.4 L; 29/149.5 R
[51] Int. Cl.² .................... F16C 33/00; F16C 19/04
[58] Field of Search ...... 308/193, 174, 187, DIG. 8, 308/DIG. 9, 36.1, 78; 29/148.4 L, 149.5 R

[56] References Cited
UNITED STATES PATENTS
3,414,084  12/1968  Bues et al. .......................... 308/187
3,653,732  4/1972  Fairbank ............................. 308/193

Primary Examiner—M. Henson Wood, Jr.
Assistant Examiner—Richard A. Bertsch
Attorney, Agent, or Firm—Kenway & Jenney

[57] ABSTRACT

A method and apparatus for reducing the friction in a ball-bearing pivot axis assembly. Within the bearing assembly, the balls are floated in a fluid lubricant and, especially in fully-floated units, the weight of the balls is an overriding consideration in the generation of sliding frictional torques. In the present invention these gravitational effects are counteracted by matching as nearly as possible the ball density and the flotation fluid density, the floated weight decrease serving to bring down the friction proportionally with an ultimate theoretical complete reduction of frictional uncertainty from that of known systems.

4 Claims, 11 Drawing Figures

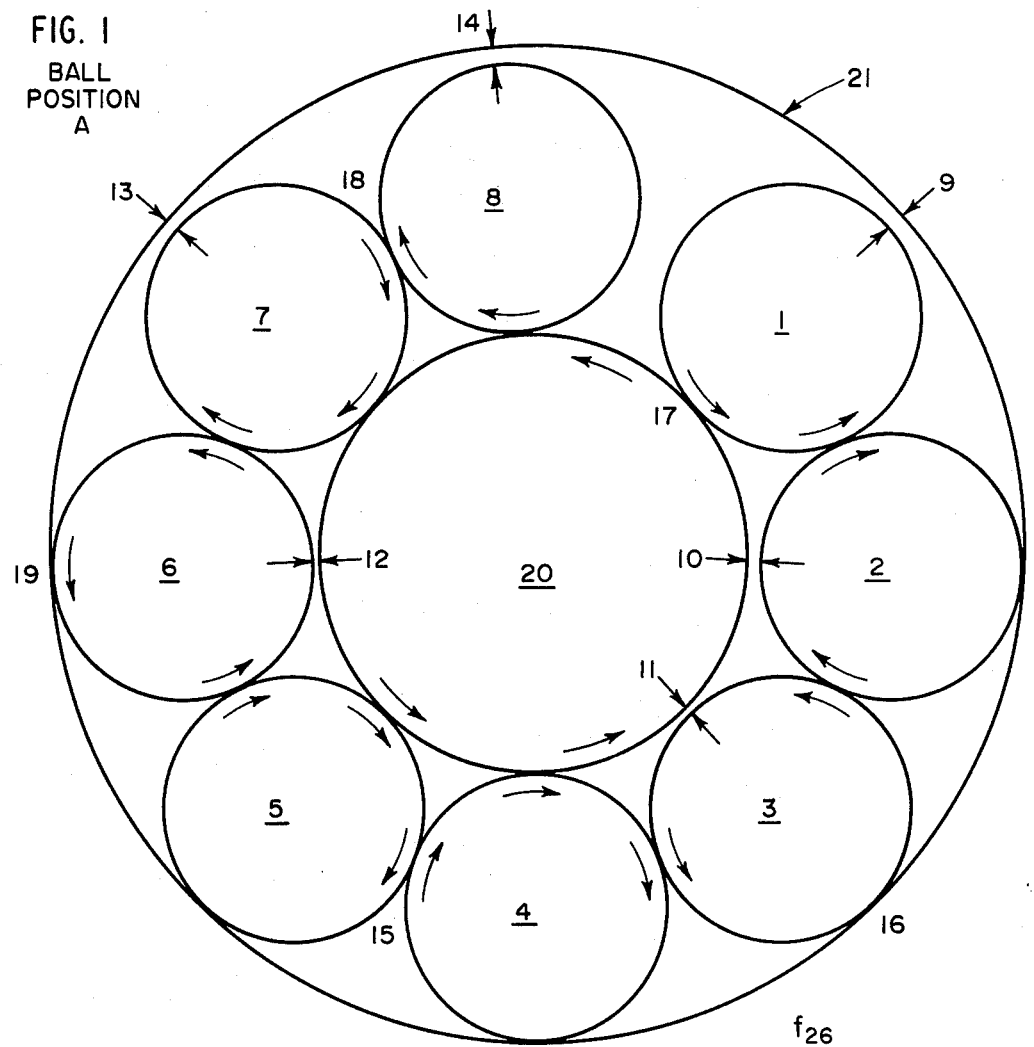
FIG. 1 BALL POSITION A
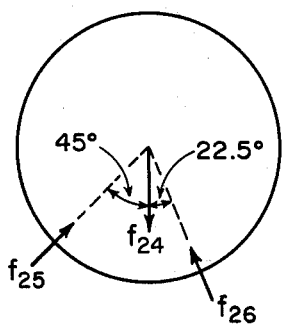
FIG. 2
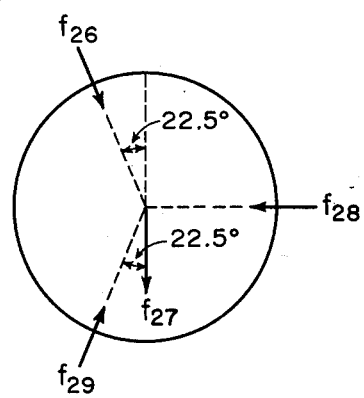
FIG. 3
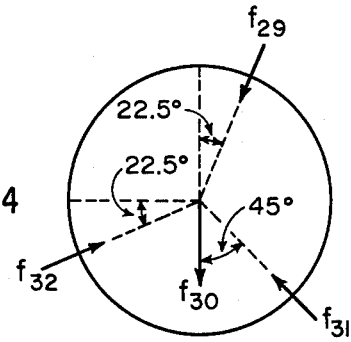
FIG. 4

BALL POSITION B

FRICTION REDUCING BEARING

BACKGROUND OF THE INVENTION

In U.S. Pat. No. 3,653,732, assigned to the same assignee as the present application, there is disclosed a multi-ball pivot assembly for use in precision bearing applications such as gyroscope suspension systems. Since only very small angular rotations are encountered in such systems, there is little concern for control of running friction and justifiably great concern for control of starting friction and random torque effects. Such friction errors have been traced to such factors as raceway misalignment and imperfections. The assembly of the cited patent utilizes no inner raceway and the balls are in direct contact with the surface of a rotatable shaft. As well, no conventional outer raceway is used. A right cylinder serves as the outer ring against which the balls bear. The balls are constrained axially by a pair of flat washers attached to the outer ring. Eight balls substantially fill the annular volume defined by the shaft, the outer ring, and the washers. The elimination of raceways and conventional ball retainers avoids the friction problems usually associated with these elements. Only point contact between structural elements remains. Suitably hard materials tooled to instrument quality surface finish further reduce friction. Nominal radial clearances are allowed but tolerances on diameters, roundness, and finish are controlled so that total radial shake under all orientations does not result in either an interference (zero radial play) or excessive looseness.

Friction control in the bearing assembly of the cited patent contributes to gyroscope precision superior to any previously known bearing assemblies. However, that assembly like others then available, was developed without recognition of the significance of the density of the balls as related to the density of the fluid lubricant that fills the assembly.

Some balls of less density than those of conventional steel bearings have been used; for example, hollow or glass balls. However, their use was for other reasons. That there has been no serious consideration of matching densities may be attributable to a lack of awareness that a match reduces frictional uncertainty in the bearing assembly. Tungsten carbide balls, with a specific gravity of 14.8 grams per cubic centimeter were used in the assembly of the cited patent. They met known requirements for the ball bearings, including smoothness and hardness. Additionally, the extreme small size of the balls, preferably 0.0078 inches in radius, restricted the choice of acceptable materials to those which could be machined to the required specifications. The fluid lubricant of the assembly, usually bromotrifluoroethylene, has a specific gravity of 2.3 grams per cubic centimeter and was likewise chosen for its known lubricating and other qualities. The difference of density between balls and fluid produced an effective floated weight for each ball of 0.399 dynes. Concentration on the multiplicity of requirements that ball and lubricant materials respectively had to meet probably blinded developers from correlating a density match and a friction reduction. Within the assembly, the uncertainty force of sliding friction was present and tolerated for lack of knowledge of a method of reducing it.

SUMMARY OF THE INVENTION

The present invention contemplates a close match of ball and fluid densities. It derives from an analysis of the sliding frictional torques that are created by the effective floated ball weight of 0.399 dynes. It will be shown that the resultant frictional torque on the pivot shaft is directly proportional to this floated weight. Replacing the tungsten carbide balls with sapphire ($Al_2O_3$) balls with a specific gravity of 3.98 grams per cubic centimeter reduces the sliding friction uncertainty force to 13.4% of its former value. As expected, this reduction reflects the ratio of floated weights. The ideal would be if ball and fluid materials exactly matched in density and respectively meeting the requirements for bearings and lubricants. The floated weight reduces to zero in the ideal case. The theory developing this proportionality is illustrated by figures of two typical ball positions.

FIG. 1 is a schematic cross-sectional view of the pertinent parts of the assembly in a typical ball position, referred to as (A).

FIG. 2 is a concentration on a particular numbered ball in (A), showing forces.

FIG. 3 is a concentration on a second, numbered ball in (A), showing forces.

FIG. 4 is a concentration on a third, numbered ball in (A), showing forces.

Figure 5:
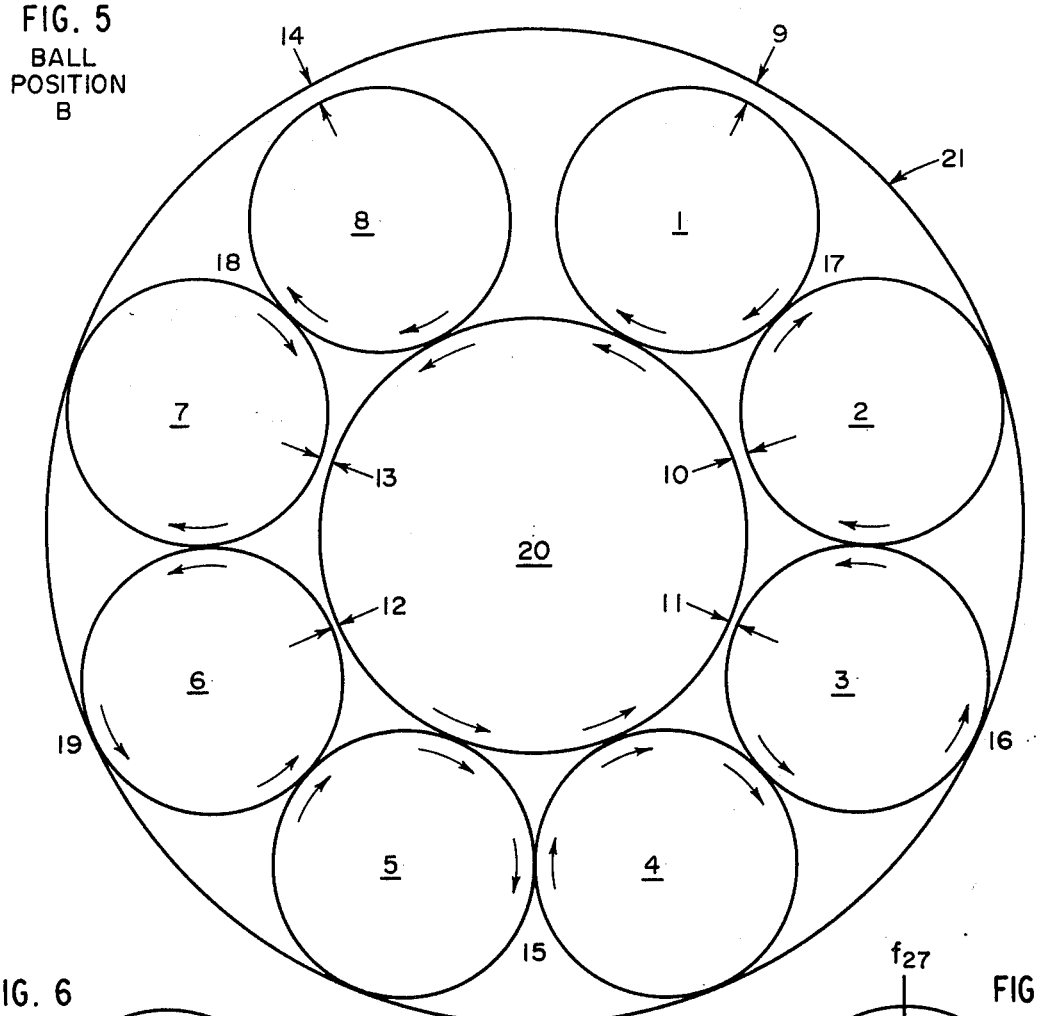
FIG. 5 is a schematic cross-sectional view of the pertinent parts in a second typical ball position, referred to as (B)

FIG. 1 shows the pertinent parts of the assembly in cross-sectional view. A typical equilibrium rest position with an interior pivot shaft 20 resting on balls 4 and 5 is represented. The balls have a radius less than one half the difference of the radii of the interior pivot shaft 20, and an exterior ring 21. Clearances for radial play develop in this typical ball position as shown by 9, 10, 11, 12, 13, and 14. An example of typical materials in an actual assembly are as follows:

1. The pivot shaft 20 may be made of tungsten carbide which is a suitable material because of its high modulus of elasticity and high compressive strength.

2. Prior to this invention, the balls have also been tungsten carbide, preferably of instrument grade; and, 3. The exterior ring is made of tungsten carbide.

With eight balls present, the angle from the interior pivot shaft center to adjacent ball centers is taken with accuracy to be 45° or 360/8. Simple geometry shows the angle between the line joining adjacent ball centers and either the horizontal or vertical to be 22.5°. If the pivot were to rotate through a small angle, arcuate arrows on the balls show the sense of ball rotation which would be induced. For example, the balls 3, 2, and 1 rotate respectively counterclockwise, clockwise, and counterclockwise in response to the clockwise rotation of ball 4. The ball 8 is no exception since its direction is prompted by the pivot 20 on which it primarily rests. The ring 21 is immobile. Ball-ball contact points and ball-pivot contact points are sources of sliding rather than rolling friction where the senses of rotation are opposed. The points 15, 17, and 18 illustrate this. Contact points with the outer ring 21 are potential areas of sliding friction. However, consistent with ball freedom of motion, some ring contacts are pivot points. That is, the larger the force at the contact point, the greater is the tendency of the ball to pivot about an axis skewed from the perpendicular by the ball's simultaneous tendency to rotate. Consequently, the balls 2, 4, and 5 are taken to pivot at their contacts with the outer ring. The points 16 and 19 are taken as rub points, where the balls are most likely to slide. At the point 18, sliding friction is considered negligible because the position of the ball 8 indicates that little of its weight is directed at ball 7.

FIG. 2 isolates the ball 1 in FIG. 1 and shows a component breakdown of the weight. This is essentially the basis of the mathematical analysis which proves the proportionality of uncertainty torque and floated weight. The volume of the sample ball 1, 0.0078 inches in radius, is $32.6 \times 10^{-6}$ cubic centimeters. For tungsten carbide, the effective density floated in chlorofluoride carbon is 12.5 grams per cubic centimeter. The floated weight of 0.399 dynes is represented by the arrow $f_{24}$. Forces $f_{25}$ and $f_{26}$, directed at the ball center along lines respectively from the pivot center and the center of the ball 2 are found by a summation of torques technique. This principle will serve throughout the analysis to find unknown forces. Angles are as shown. The torque sums are taken about contact points and set equal to zero. The unknown force at the summation point is eliminated and the second unknown isolated for solution. With $r$ the ball radius the resulting equations are:

$$f_{24}\ r\ \sin\ (45°) - f_{26}\ r\ \sin\ (67.5°) = 0 \tag{1}$$

$$-f_{24}\ r\ \sin\ (22.5°) + f_{25}\ r\ \sin\ (67.5°) = 0 \tag{2}$$

The solutions are: $f_{25} = 0.1653$ dynes and $f_{26} = 0.3054$ dynes.

The force analysis is continued in FIG. 3 with attention on the ball 2 of FIG. 1. Force 26 is due to the ball 1; force 27 is the weight of the ball 2; force 28 is the force due to the exterior ring; and force 29 is due to the ball 3. Summing torques to zero about the point of contact with the exterior ring yields $f_{29}$.

$$f_{29}\ r\ \sin\ (67.5°) - f_{26}\ r\ \sin\ (67.5°) - f_{27}\ r = 0 \tag{3}$$

The solution is: $f_{29} = 0.7373$ dynes.

Similarly, the sum about the point of contact with the ball 3 shows $f_{28}$ to be 0.399 dynes.

$$f_{27}\ r\ \sin\ (22.5°) + f_{26}\ r\ \sin\ (45°) - f_{28}\ r\ \sin\ (67.5°) = 0 \tag{4}$$

FIG. 4 isolates the ball 3. The analysis is similar. Force 29 is due to the ball 2; force 30 is the ball weight; force 31 is from the exterior ring; and force 32 is due to the ball 4.

The torque summations are:

$$f_{30}\ r\ \sin\ (67.5°) + f_{29}\ r\ \sin\ (45°) - f_{31}\ r\ \sin\ (67.5°) = 0 \tag{5}$$

$$f_{32}\ r\ \sin\ (67.5°) - f_{30}\ r\ \sin\ (45°) - f_{29}\ r\ \sin\ (67.5°) = 0 \tag{6}$$

The unknown forces are: $f_{31} = 0.9633$ dynes and $f_{32} = 1.0427$ dynes.

Knowledge of forces $f_{32}, f_{31}, f_{25}$, and $f_{28}$ is sufficient to calculate frictional sliding torques at points 15, 16, and 17 and 19 of FIG. 1. At the point 15, the friction-producing force is the same as $f_{32}$. Otherwise, the ball 4 would not be in equilibrium. The force produces a frictional drag on the ball directed perpendicular to the force itself. A coefficient of friction of 0.5 is assumed for simplicity and the resultant torque is:

$$f_{32}\ r\ (0.5) = 0.01035\text{ dyne centimeter}$$

At the point 16, the force in question is $f_{31}$. It generates a frictional torque of 0.009558 dyne centimeters. Force 25 at the point 17 produces a torque of 0.001640 dyne centimeters while at the point 19, a force equal to $f_{28}$ produces a torque of 0.003959 dyne centimeters. Total ball frictionl torque is 0.02551 dyne centimeters. Multiplying by the ratio of pivot to ball diameter gives the mechanical coupling of pivot and ball torques. The result, 0.04147 dyne centimeters, is the total friction pivot torque. To overcome this frictional drag, a minimum pivot force of 2.571 dynes is required and all forces greater than 2.571 will be sufficient to force ball motion and the resultant torque uncertainty.

At this point, it can be observed that the frictional torque sum is proportional to the floated ball weight. The analysis takes the floated weight and finds other contact forces from the weight by solving a succession of homogeneous linear equations with constant geometric coefficients. Each force derived is a constant fraction of the floated ball weight. The sum of torques retains this proportionality.

Figure 6:
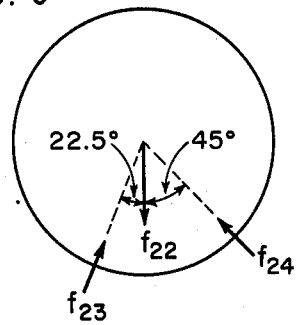
FIG. 6 through 9 are concentrations on particular numbered balls in (B)

An illustration of a second typical ball position in FIG. 5 re-establishes this same proportionality. The pivot shaft is positioned symmetrically above the balls 4 and 5. The ball 8 is now the mirror image of the ball 1, both balls rotating in response to shaft motion since they rest primarily on the shaft 20. Consequently, sliding friction occurs at points 17 and 18 since the underlying ball motion is opposed. Point 15 is another point of ball-ball sliding friction and the points 16 and 19 are the rub points with the exterior ring. Clearances 9 through 14 are shown. The force analysis will be redone in a summary fashion. FIG. 6 shows $f_{22}, f_{23}$, and $f_{24}$. Respectively, they are the ball weight, the shaft force, and the underlying ball's support. The angles of the latter two forces with the vertical are 22.5° and 45°. Summing torques about the point of contact with the shaft yields a value of 0.1653 dynes for $f_{24}$. The same technique at the point of contact with the ball 2 gives 0.3054 dynes for $f_{23}$.

Figure 7:
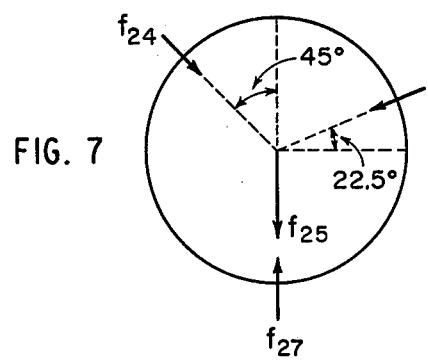

FIG. 7 shows the ball 2 with the force from the ball 1 ($f_{24}$), its own weight ($f_{25}$), the force of the exterior shaft directed towards the center of the ball 2 ($f_{26}$), and the force from the ball 3 on the ball 2 ($f_{27}$).

The torque equations are:

$$f_{24}\ r\ \sin\ (67.5°) + f_{25}\ r\ \sin\ (67.5°) = f_{27}\ r\ \sin\ (67.5°) = 0 \tag{7}$$

$$f_{24}\ r\ \sin\ (45°) - f_{26}\ r\ \sin\ (67.5°) = 0 \tag{8}$$

The solutions are: $f_{27} = 0.5653$ dynes and $f_{26} = 0.1266$ dynes.

Figure 8:
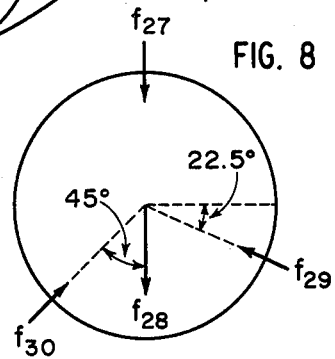

FIG. 8 continues the force analysis with the ball 3. $f_{27}$ is the force from the ball 2, $f_{28}$ is the weight of the ball 3. $f_{29}$ is the force from the exterior shaft and $f_{30}$ is the force from the ball 4. The torque equations provide the latter two unknowns as follows:

$$f_{27}\ r\ \sin\ (67.5°) + f_{28}\ r\ \sin\ (67.5°) - f_{30}\ r\ \sin\ (67.5°) = 0 \tag{9}$$

$$f_{30} = .964\text{ dynes}$$

$$f_{27} r \sin (45°) + f_{28} r \sin (45°) - f_{29} r \sin (67.5°) = 0 \quad (10)$$

$$f_{29} = .737 \text{ dynes}$$

Figure 9:
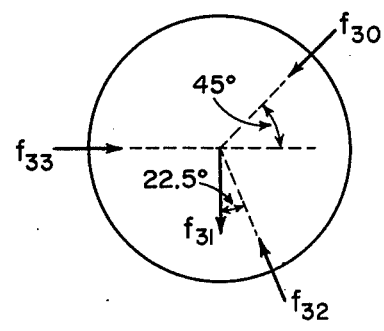

FIG. 9 concludes the force study. The ball 4 is shown with the force from the ball 3 ($f_{30}$), the force from the exterior shaft ($f_{32}$), the weight of the ball 4 ($f_{31}$) and the force from the ball 5 ($f_{33}$). The equations and solutions follow:

$$f_{31} r \sin (90°) + f_{30} r \sin (45°) - f_{32} r \sin (67.5°) = 0 \quad (11)$$

$$f_{32} = 1.162 \text{ dynes}$$

$$f_{31} r \sin (22.5°) + f_{30} r \sin (67.5°) + f_{33} r \sin (67.5°) = 0 \quad (12)$$

$$f_{33} = 1.131 \text{ dynes}$$

Torques at the sliding friction points 15–19 of FIG. 5 can now be calculated. At point 15 the torque producing force is $f_{33}$. The same coefficient of friction 0.5, is assumed. The torque is $(f_{33}) (r) (0.5) = 0.01119$ dyne centimeters. The force in question at point 16 is $f_{29}$. By symmetry, this same force produces torque at point 19. The sum of the two is $(2) (f_{29}) (r) (0.5) = 0.0146$ dyne centimeters. Symmetry likewise exists between the point 17 and 18. The force common to both points is $f_{24}$. The torque for the two combined is $(2) (f_{24}) (r) (0.5) = 0.00325$ dyne centimeters. The total friction ball torque is 0.02903 dyne centimeters. The total pivot torque is 0.0467 dyne centimeters.

The conclusions drawn from the foregoing are:
1. Friction forces for the two ball positions calculated are similar;
2. Frictional uncertainty is directly proportional to floated weight;
3. Friction forces with tungsten carbide balls will result in significant drift uncertainty; and,
4. Frictional uncertainty reduces proportionally to 13.4% of its original value if sapphire balls with a floated weight of 1.68 grams per cubic centimeter are used.

Figure 10:
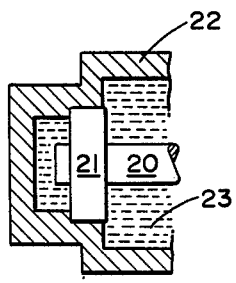
FIG. 10 is a view of a specific bearing.

FIG. 10 illustrates schematically a bearing 21 in which the balls are disposed in the manner discussed above about a shaft 20 and are retained in an enclosure 21 of the type disclosed in the cited U.S. Pat. No. 3,653,732. There is also shown a housing 22 containing a fluid lubricant 23 such as bromotrifluoroethylene, KRYTOX or the like in which the balls are made of sapphire, ($Al_2 O_3$). A significant decrease in frictional torque uncertainty is obtained.

Figure 11:
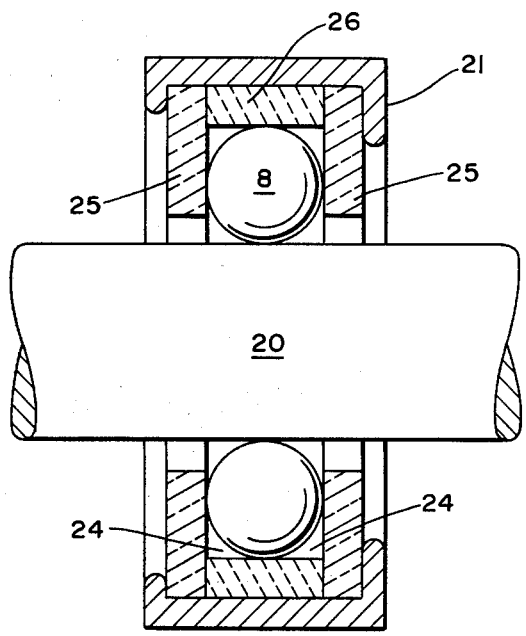
FIG. 11 illustrates internal components of a bearing similar to that of FIG. 10.

In FIG. 11, internal components of a bearing similar to that of FIG. 10 herein and to that of the above-cited patent are shown to include the shaft 20, an outer ring 26 against which the balls may bear, and a pair of flat washers 25 to constrain the balls axially. The balls 8 may be seen to substantially fill the annular volume defined by the shaft 20, the outer ring 26 and the washers 25, open areas 24 being filled by the fluid which has a density matching or nearly matching that of the balls.

The following data was taken on such a gas bearing gyroscope with 65,000 dcs angular momentum. Sapphire bearings floated in bromotrifluoroethylene on the output axis were incorporated. The gyro was positioned with its output axis parallel to earth's axis, and drift readings were taken every 45° of table angle.

Data Set No. 1

| Table Angle ° | CW, °/hr Run 1 | Run 2 | CCW, °/hr Run 3 | Run 4 | 1σ, °/hr | 1σ, dy-cm. |
|---|---|---|---|---|---|---|
| 0° | −5.410 | −5.246 | −5.276 | −5.286 | 0.0723 | .02278 |
| 45° | −9.233 | −9.150 | −9.160 | −9.120 | 0.0483 | .01522 |
| 90° | −8.914 | −8.840 | −8.880 | −8.840 | 0.0357 | .01125 |
| 135° | −4.670 | −4.720 | −4.760 | −4.680 | 0.0411 | .01295 |
| 180° | +0.880 | +0.820 | +0.800 | +0.870 | 0.0386 | .01216 |
| 225° | +4.610 | +4.630 | +4.380 | +4.630 | 0.0236 | .00744 |
| 270° | +4.484 | +4.470 | +4.520 | +4.490 | 0.0208 | .00655 |
| 315° | +0.450 | +0.430 | +0.430 | −0.470 | 0.0191 | .00602 |

Data Set No. 2

| Table Angle ° | CW, °/hr Run 1 | Run 2 | CCW, °/hr Run 3 | Run 4 | 1σ, °/hr | 1σ, dy-cm. |
|---|---|---|---|---|---|---|
| 0° | −5.26 | −5.34 | −5.20 | −5.134 | 0.0877 | .02764 |
| 45° | −9.13 | −9.13 | −9.14 | −9.110 | 0.0125 | .00394 |
| 90° | −8.86 | −8.87 | −8.87 | −8.86 | 0.0057 | .00180 |
| 135° | −4.75 | −4.70 | −4.75 | −4.75 | 0.0250 | .00788 |
| 180° | +0.930 | +0.88 | +0.88 | +0.96 | 0.0395 | .01245 |
| 225° | +4.670 | +4.65 | +4.56 | +4.60 | 0.0497 | .01566 |
| 270° | +4.500 | +4.43 | +4.48 | +4.56 | 0.0538 | .01695 |
| 315° | +0.43 | +0.414 | +0.34 | +0.36 | 0.0429 | .01352 |

The reduction of gravitational forces due to approximate matching produces the decrease in keeping with the proportionality developed above.

What is claimed is:

1. A method of reducing friction in a ball-bearing pivot assembly which includes balls of a given density comprising the step of floating said balls within said assembly in a fluid lubricant of density substantially equal to that of said balls.

2. A bearing assembly comprising an inner circular shaft, an outer ring disposed concentrically about said shaft and forming an annular volume thereabout, a multiplicity of balls disposed within said annular volume, means extending from separated points on said shaft to said outer ring and serving to constrain said balls from axial movement, and a fluid lubricant in which said balls float within said annular volume, said fluid lubricant having substantially the same density as that of said balls.

3. A bearing assembly as defined in claim 2 wherein said balls are made of sapphire.

4. A bearing assembly as defined in claim 2 wherein said fluid lubricant is composed of bromotrifluoroethylene.

* * * * *

UNITED STATES PATENT AND TRADEMARK OFFICE
CERTIFICATE OF CORRECTION

PATENT NO. : 3,963,284
DATED : June 15, 1976
INVENTOR(S) : John R. Bouchard

It is certified that error appears in the above-identified patent and that said Letters Patent are hereby corrected as shown below:

Column 4, lines 52 and 53, "$f_{24}$ r sin (67.5°) + $f_{25}$ r sin (67.5°) = $f_{27}$ r sin (67.5°) = 0" should be -- $f_{24}$ r sin (67.5°) + $f_{25}$ r sin (67.5°) - $f_{27}$ r sin (67.5°) = 0 -- .

Signed and Sealed this

Thirty-first Day of August 1976

[SEAL]

Attest:

RUTH C. MASON
*Attesting Officer*

C. MARSHALL DANN
*Commissioner of Patents and Trademarks*